UNITED STATES PATENT OFFICE.

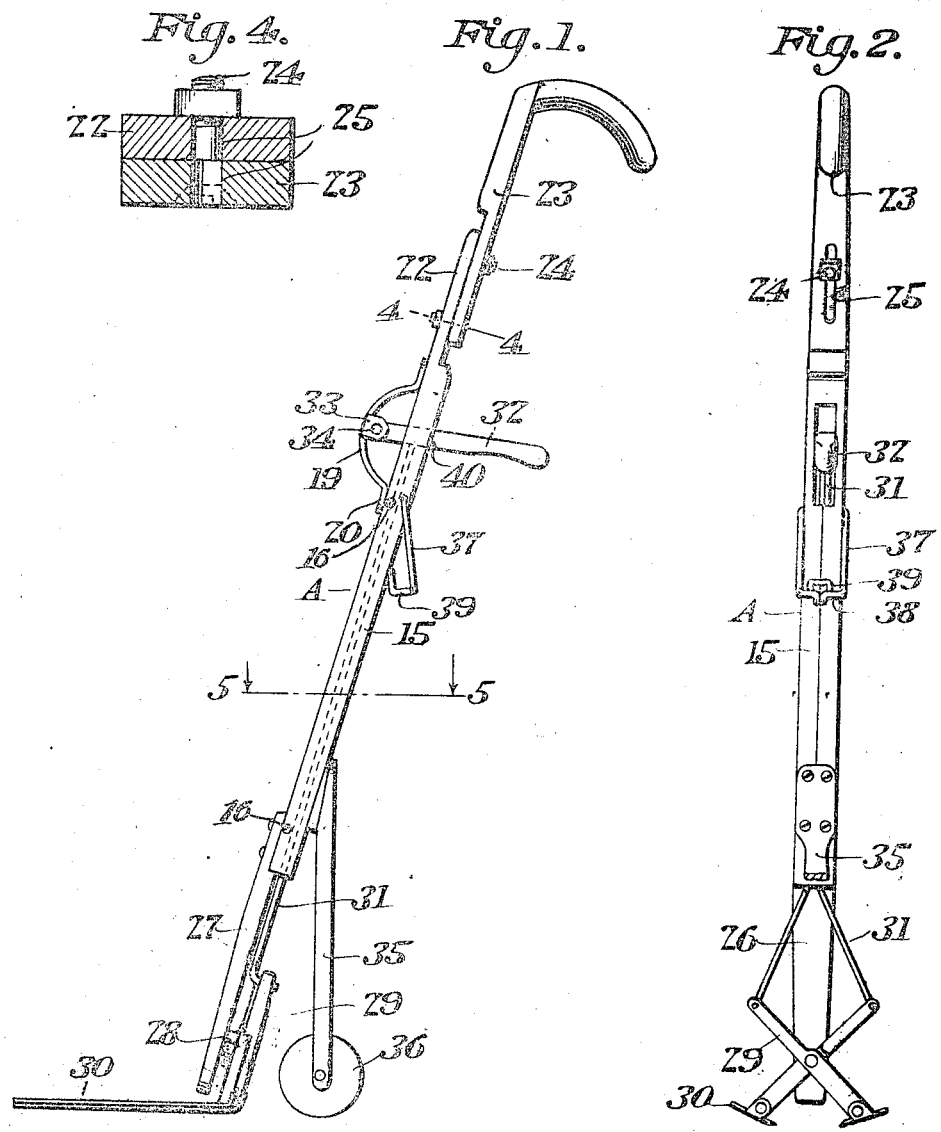

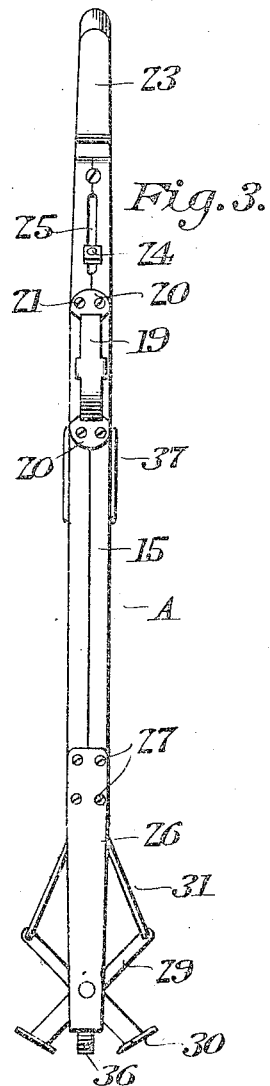
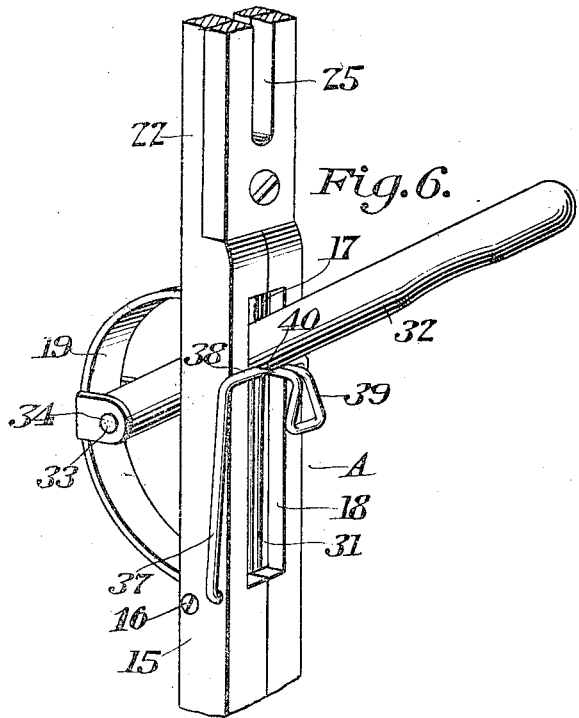
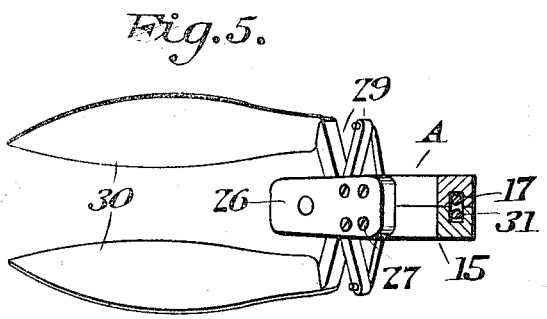

ISLEY H. BEACH AND ALFRED QUINTY, OF SHIRLEY, MASSACHUSETTS.

LAWN-TRIMMER.

1,175,683.

Specification of Letters Patent. Patented Mar. 14, 1916.

Application filed May 14, 1915. Serial No. 28,202.

*To all whom it may concern:*

Be it known that we, ISLEY H. BEACH and ALFRED QUINTY, citizens of the United States, residing at Shirley, in the county of Middlesex and State of Massachusetts, have invented new and useful Improvements in Lawn-Trimmers, of which the following is a specification.

This invention relates to lawn trimmers, and it has particular reference to a device for trimming the edges of lawns which cannot be conveniently reached with the ordinary lawn mower.

The invention has for its object to provide a simple and effective device in the nature of a pair of shears disposed in an approximately horizontal plane, an approximately vertical handle whereby said shears are supported, and means connected with the handle for actuating the shears.

A further object of the invention is to simplify the construction, assemblage and operation of parts constituting the improved device.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings, Figure 1 is a side view of a device constructed in accordance with the invention. Fig. 2 is a rear view of the same, the supporting wheel and part of its supporting bracket having been broken away. Fig. 3 is a front elevation. Fig. 4 is a sectional detail view taken on the line 4—4 in Fig. 1. Fig. 5 is a sectional detail view taken on the line 5—5 in Fig. 1. Fig. 6 is a perspective detail view of the locking device.

Corresponding parts in the several figures are denoted by like characters of reference.

In the construction of the improved device there is employed an elongated sheath or casing A comprising two side members 15 which are connected together by transverse bolts 16, the inner faces of said side members being grooved, as shown at 17, so as to produce a housing. The sheath or casing A is provided near its upper end with a longitudinal slot 18 which is spanned by an arch 19 secured exteriorly on the casing, said arch being provided with terminal feet 20 which are apertured for the passage of fastening members, such as screws 21 that engage the respective side members 15 of the casing, thereby assisting in securely assembling said side members. The sheath or casing is provided at its upper end with an extension 22 with which a handle member 23 is adjustably connected by means of bolts 24 engaging slots 25 in said handle member and extension.

Secured on the front face of the casing at the lower end thereof is a foot member 26, said foot member being secured by fastening means, such as screws 27, that engage the respective side members of the casing and assist in securely assembling the same. The foot member 26 is provided on its rearward face with a lug 28 on which are pivoted arms or levers 29, the lower ends of which carry the shear blades 30. The upper ends of the levers 29 are connected by rods 31 with a hand lever 32 which is fulcrumed on the arch member 19 which is provided with lugs 33 for the passage of the pivot member 34, said hand lever extending through the slot 18, as shown. It will be readily seen that by manipulating the hand lever, the arms or levers 29 will be actuated, thus operating the blades 30. Securely mounted on the rearward face of the casing A is a downwardly extending arm 35 carrying a ground engaging wheel 36 which, when in engagement with the ground, will support the device in the proper position for operation without any effort on the part of the operator.

Pivotally connected with the side members 15 of the casing is a yoke 37, the bridge of which, 38, is bent to form a handle 39. This yoke which is made of resilient material, such as steel wire, is adapted to engage a notch 40 in the underside of the hand lever 32, which latter may thus be locked in position, thus preventing accidental movement of the cutting blades when the device is not in use.

From the foregoing description, taken in connection with the drawings hereto annexed, the operation and advantages of this invention will be readily understood. The adjustable handle may be moved to any convenient position to accommodate a tall or a short operator. By manipulating the hand lever 32, the cutting blades will be actuated to cut or trim the grass along the edge of a lawn, the device being held in position for operation by simply resting the wheel 36 on the ground and pushing the device along as the cutting is being performed. When the device is not in use, the yoke 37 may be swung into engagement with the notch 40 in the hand lever, thus locking the parts against accidental movement.

Having thus described the invention, what is claimed as new, is:—

1. In a device of the class described, a housing or sheath comprising elongated side members having grooved opposed faces, and means for connecting said side members together including an arch member having apertured feet, and fastening members extending through said feet and engaging the respective side members.

2. In a device of the class described, an elongated sheath having a transverse slot, said sheath including two side members, an arch member spanning the slot and connected with the respective side members to assist in assembling the same, a foot member likewise connected with the respective side members, levers fulcrumed on the foot member and carrying coacting shear blades, a hand lever fulcrumed on the arch member and extending through the transverse slot, and rods extending through the sheath and connecting the hand lever with the blade carrying levers.

3. In a device of the class described, an elongated sheath, a foot member connected therewith, blade carrying levers mounted on the foot member, means for actuating the blade carrying levers including a hand lever, and rods extending through the sheath and connecting said hand lever with the blade carrying levers, said hand lever being provided with a notch in the underside thereof, in combination with a resilient yoke pivoted on the sheath and adapted for locking engagement with the notch in the hand lever.

In testimony whereof we affix our signatures in presence of two witnesses.

ISLEY H. BEACH.
ALFRED QUINTY.

Witnesses:
ALFRED A. QUINTY, Jr.,
WILFRID L. QUINTY.